United States Patent
Thresh et al.

(10) Patent No.: US 10,011,078 B2
(45) Date of Patent: Jul. 3, 2018

(54) SYSTEM FOR USING MULTIPLE OPTICAL SENSOR ARRAYS TO MEASURE FEATURES ON OBJECTS PRODUCED IN A THREE-DIMENSIONAL OBJECT PRINTER

(71) Applicant: Xerox Corporation, Norwalk, CT (US)

(72) Inventors: Donald E. Thresh, Fairport, NY (US); James D. VanBortel, Rochester, NY (US); Michael N. Soures, Webster, NY (US); Richard B. Gruszewski, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 391 days.

(21) Appl. No.: 14/872,499

(22) Filed: Oct. 1, 2015

(65) Prior Publication Data
US 2017/0095977 A1    Apr. 6, 2017

(51) Int. Cl.
| | |
|---|---|
| *B29C 64/386* | (2017.01) |
| *B29C 67/00* | (2017.01) |
| *H04N 1/00* | (2006.01) |
| *B33Y 50/02* | (2015.01) |
| *B29C 64/20* | (2017.01) |
| *B29C 64/40* | (2017.01) |
| *B29C 64/112* | (2017.01) |
| *H04N 1/03* | (2006.01) |
| *H04N 1/028* | (2006.01) |
| *B33Y 30/00* | (2015.01) |
| *B33Y 50/00* | (2015.01) |
| *G01B 11/00* | (2006.01) |
| *B33Y 10/00* | (2015.01) |

(52) U.S. Cl.
CPC ........ *B29C 67/0088* (2013.01); *B29C 64/112* (2017.08); *B29C 64/20* (2017.08); *B29C 64/386* (2017.08); *B29C 64/40* (2017.08); *B29C 67/0059* (2013.01); *B29C 67/0092* (2013.01); *B33Y 50/02* (2014.12); *H04N 1/00827* (2013.01); *H04N 1/02805* (2013.01); *H04N 1/02895* (2013.01); *H04N 1/03* (2013.01); *B33Y 10/00* (2014.12); *B33Y 30/00* (2014.12); *B33Y 50/00* (2014.12); *G01B 11/00* (2013.01)

(58) Field of Classification Search
CPC ... H04N 1/00827; B33Y 50/00; B29C 64/386
See application file for complete search history.

(56) References Cited

U.S. PATENT DOCUMENTS

| | | | |
|---|---|---|---|
| 5,917,332 | A | 6/1999 | Chen et al. |
| 6,173,070 | B1 | 1/2001 | Michael et al. |
| 6,377,865 | B1 | 4/2002 | Edelsbrunner et al. |
| 6,763,141 | B2 * | 7/2004 | Xu ..................... H04N 1/00002 382/199 |

(Continued)

FOREIGN PATENT DOCUMENTS

EP    2 584 534 A2    4/2013

*Primary Examiner* — Benjamin A Schiffman
(74) *Attorney, Agent, or Firm* — Maginot Moore & Beck LLP

(57) ABSTRACT

A three-dimensional object printer generates image data of an object being formed in the printer with a plurality of light sources and a plurality of optical sensor arrays. A controller receives the image data and identifies measurements of the object and of the features of the object. The controller compares the measurements to expected measurements and adds material or removes material from the object in response to the identified measurements being outside a predetermined range about the expected measurements.

10 Claims, 4 Drawing Sheets

(56) References Cited

U.S. PATENT DOCUMENTS

| | | | |
|---|---|---|---|
| 7,047,151 B2 | 5/2006 | Chang | |
| 7,457,455 B2 | 11/2008 | Matsui et al. | |
| 8,368,964 B2* | 2/2013 | Xu | G06T 5/003 |
| | | | 358/3.27 |
| 8,477,154 B2 | 7/2013 | Davis et al. | |
| 8,837,026 B2 | 9/2014 | Fisker et al. | |
| 9,079,440 B1* | 7/2015 | Bonino | B41J 29/393 |
| 9,079,441 B1* | 7/2015 | Giacobbi | B41J 29/393 |
| 9,302,519 B1* | 4/2016 | Clark | B29C 64/112 |
| 9,327,537 B2* | 5/2016 | Conrow | B41J 29/393 |
| 9,352,572 B2* | 5/2016 | Derleth | B41J 2/16579 |
| 9,415,546 B2* | 8/2016 | Conrow | B29C 67/0088 |
| 2007/0268540 A1* | 11/2007 | Gaspardo | G06T 7/579 |
| | | | 359/196.1 |
| 2008/0148803 A1 | 6/2008 | Skultety-Betz et al. | |
| 2010/0157312 A1* | 6/2010 | Van Amstel | G01B 11/24 |
| | | | 356/511 |
| 2011/0205583 A1 | 8/2011 | Young et al. | |
| 2012/0290259 A1 | 11/2012 | McAfee et al. | |
| 2013/0235037 A1 | 9/2013 | Baldwin et al. | |
| 2014/0240700 A1* | 8/2014 | Ogawa | G01N 21/956 |
| | | | 356/244 |
| 2014/0376064 A1* | 12/2014 | Rosberg | G01B 11/2513 |
| | | | 358/475 |
| 2015/0210011 A1* | 7/2015 | Conrow | B29C 67/0088 |
| | | | 264/40.4 |
| 2015/0273857 A1* | 10/2015 | Derleth | B41J 2/16579 |
| | | | 347/19 |
| 2017/0059302 A1* | 3/2017 | Mantell | B33Y 10/00 |
| 2017/0095978 A1* | 4/2017 | Juhasz | B29C 67/0088 |

* cited by examiner

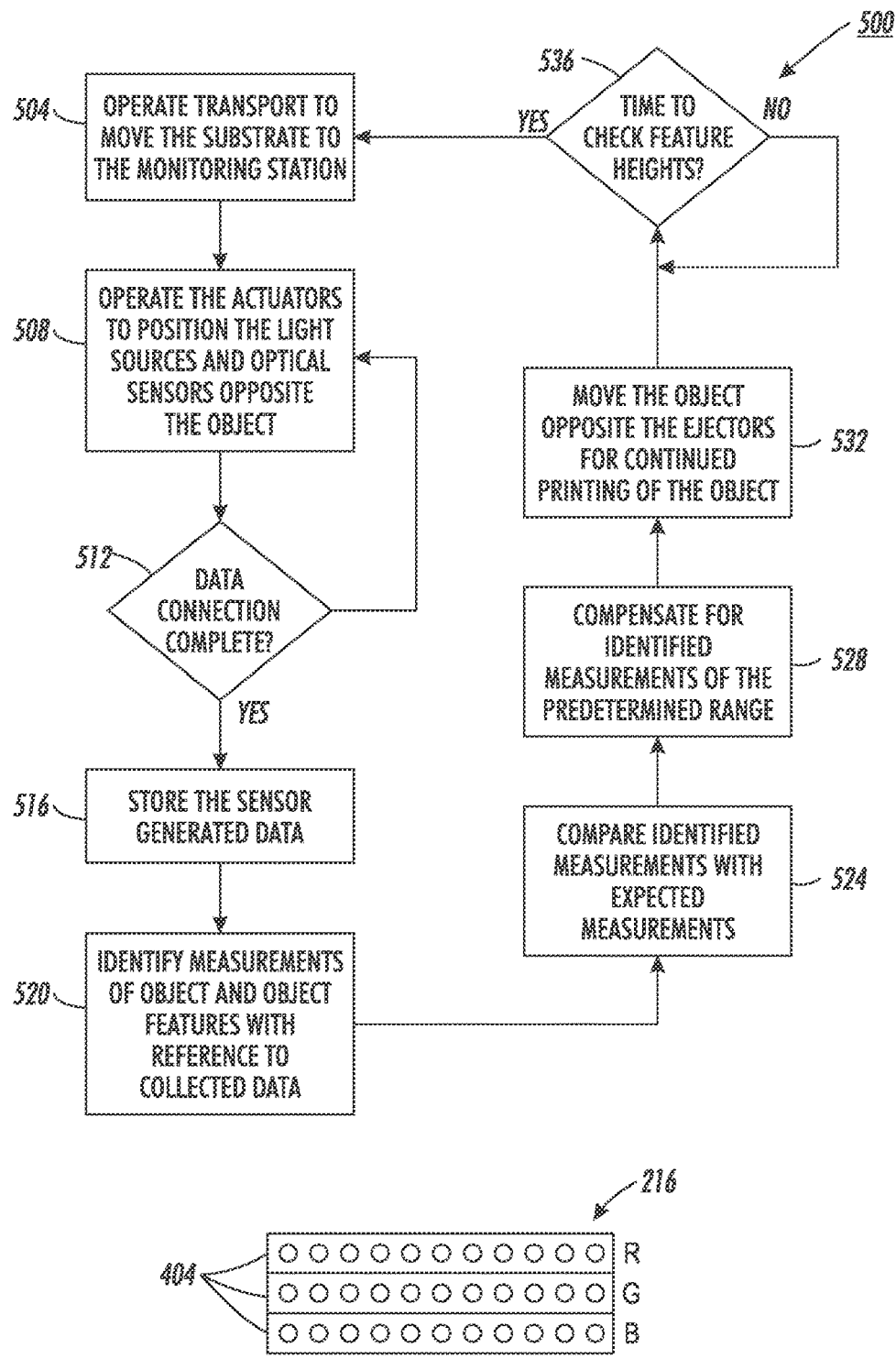

SYSTEM FOR USING MULTIPLE OPTICAL SENSOR ARRAYS TO MEASURE FEATURES ON OBJECTS PRODUCED IN A THREE-DIMENSIONAL OBJECT PRINTER

TECHNICAL FIELD

The system and method disclosed in this document relates to printers that produce three-dimensional objects and, more particularly, to accurate measurement of features on such objects in these printers.

BACKGROUND

Digital three-dimensional manufacturing, also known as digital additive manufacturing, is a process of making a three-dimensional solid object from a digital model of virtually any shape. Three-dimensional printing is an additive process in which one or more printheads eject successive layers of material on a substrate in different shapes. Three-dimensional printing is distinguishable from traditional object-forming techniques, which mostly rely on the removal of material from a work piece by a subtractive process, such as cutting or drilling.

The production of a three-dimensional object with these printers can require hours or, with some objects, even days. One issue that arises in the production of three-dimensional objects with a three-dimensional printer is consistent functionality of the inkjets in the printheads that eject the drops of material that form the objects. During printing of an object, one or more inkjets can deteriorate by ejecting the material at an angle, rather than normal, to the printhead, ejecting drops that are smaller than an inkjet should eject, or by failing to eject any drop at all. These inkjet deficiencies can result in inaccurately formed object features and, once such objects are detected, the printed objects are scrapped, restorative procedures are applied to the printheads to restore inkjet functionality, and the print job is repeated. A printer that enables detection of inaccurately formed objects while printing would enable restorative procedures to be applied during object printing so a properly formed object could be produced. In this manner, product yield for the printer is improved and its printing is more efficient.

SUMMARY

A printer that uses multiple optical sensor arrays to measure features of object made in the printer includes a substrate on which an object is formed by the three-dimensional object printer, a plurality of light sources configured to direct light onto surfaces of the object on the substrate, a plurality of optical sensor arrays having a plurality of photo detectors, the optical sensor arrays being configured to generate image data of the surfaces of the object from which the photo detectors receive light, at least one actuator operatively connected to the plurality of light sources and the plurality of optical sensor arrays to move the light sources and the optical sensor arrays with reference to the object, and a controller operatively connected to the at least one actuator, the plurality of light sources, and the plurality of optical sensor arrays, the controller being configured to operate the at least one actuator to move the object on the substrate to a position opposite the plurality of light sources and the plurality of optical sensor arrays, and to identify measurements of the object on the substrate and features of the object with reference to the data received from the plurality of optical sensor arrays.

A method of operating a printer to measure object features with multiple optical sensor arrays includes directing light from a plurality of light sources onto surfaces of an object on a substrate, generating data of the surface of the object with a plurality of optical sensor arrays, each optical sensor array having a plurality of photo detectors, operating with a controller at least one actuator operatively connected to the plurality of light sources and the plurality of optical sensor arrays to move the light sources and the optical sensor arrays with reference to the object, and identifying measurements of the object on the substrate and features of the object with reference to the data received from the plurality of optical sensor arrays.

BRIEF DESCRIPTION OF THE DRAWINGS

The foregoing aspects and other features of a printer that uses multiple optical sensor arrays to measure object features during three-dimensional printing are explained in the following description, taken in connection with the accompanying drawings.

FIG. 4 is a flow diagram of a method for operating the monitoring station of FIG. 2 and FIG. 3.

FIG. 5 depicts a structure for the optical sensor shown in FIG. 2.

DETAILED DESCRIPTION

Figure 1:
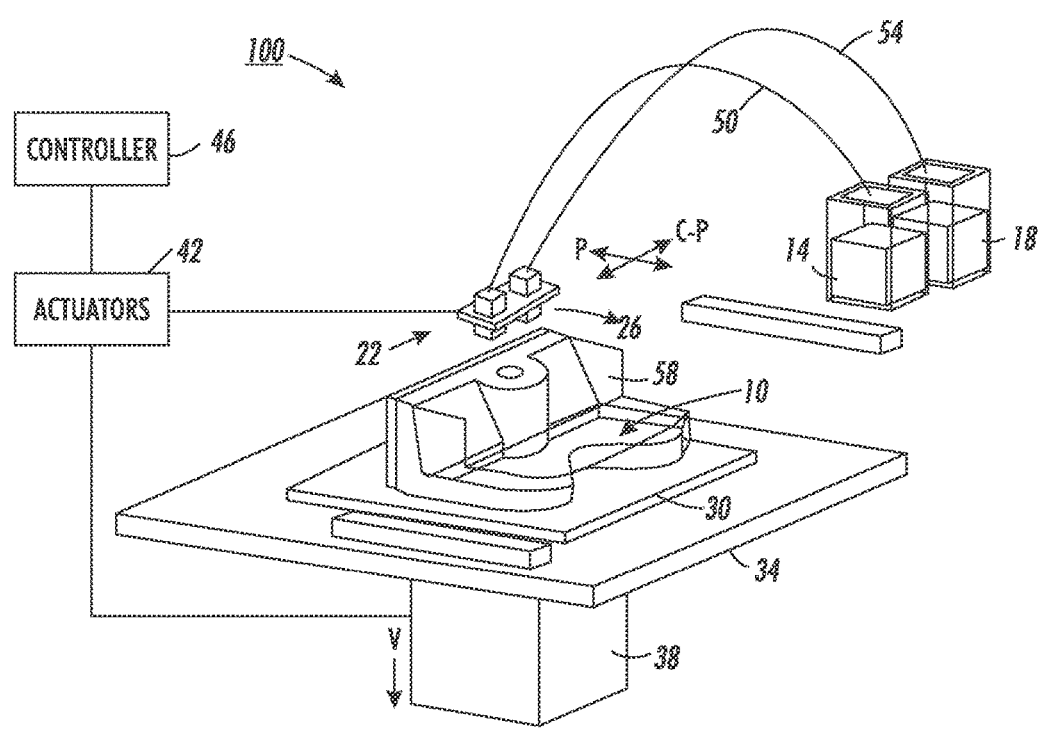
FIG. 1 is a perspective view of a three-dimensional object printer that forms an object on a substrate.

For a general understanding of the environment for the device disclosed herein as well as the details for the device, reference is made to the drawings. In the drawings, like reference numerals designate like elements.

FIG. 1 shows a configuration of components in a printer 100, which produces a three-dimensional object or part 10. As used in this document, the term "three-dimensional object printer" refers to any device that ejects material with reference to image data of an object to form a three-dimensional object. The printer 100 includes a support material reservoir 14, a build material reservoir 18, a pair of printheads 22, 26, a build substrate 30, a planar support member 34, a columnar support member 38, one or more actuators 42, and a controller 46. Conduit 50 connects printhead 22 to support material reservoir 14 and conduit 54 connects printhead 26 to build material reservoir 18. Controller 46 operates both printheads with reference to three-dimensional image data in a memory operatively connected to the controller to eject the support and build materials supplied to each respective printhead. The build material forms the structure of the part 10, while the support structure 58 formed by the support material enables the building material to maintain its shape while the material solidifies as the part is being constructed. After the part is finished, the support structure 58 is removed by washing, blowing, or melting.

The controller 46 is also operatively connected to at least one and possibly more actuators 42 to control movement of the planar support member 34, the columnar support member 38, and the printheads 22, 26 relative to one another. That is, one or more actuators can be operatively connected to structure supporting the printheads to move the printheads in a process direction and a cross-process direction with reference to the surface of the planar support member. The two printheads 22 and 26 can be adjoined in a single structure so the two printheads can move in tandem. Alternatively, the two printheads can be separated so they can be moved independently of one another. In some of these embodiments, each printhead 22 and 26 has a single ejector, while in other of these embodiments, each printhead 22 and 26 has multiple ejectors. Alternatively, one or more actuators are operatively connected to the planar support member 34 to move the surface on which the part is being produced in the process and cross-process directions in the plane of the planar support member 34. As used herein, the term "process direction" refers to movement along one axis in the surface of the planar support member 34 and "cross-process direction" refers to movement along an axis in the planar support member surface that is orthogonal to the process direction axis in that surface. These directions are denoted with the letters "P" and "C-P" in FIG. 1. The printheads 22, 26 and the columnar support member 38 also move in a direction that is orthogonal to the planar support member 34. This direction is called the vertical direction in this document, is parallel to the columnar support member 38, and is denoted with the letter "V" in FIG. 1. Movement in the vertical direction occurs with one or more actuators operatively connected to the columnar member 38, by one or more actuators operatively connected to the printheads 22, 26, or by one or more actuators operatively connected to both the columnar support member 38 and the printheads 22, 26. These actuators in these various configurations are operatively connected to the controller 46, which operates the actuators to move the columnar member 38, the printheads 22, 26, or both in the vertical direction.

Figure 2:
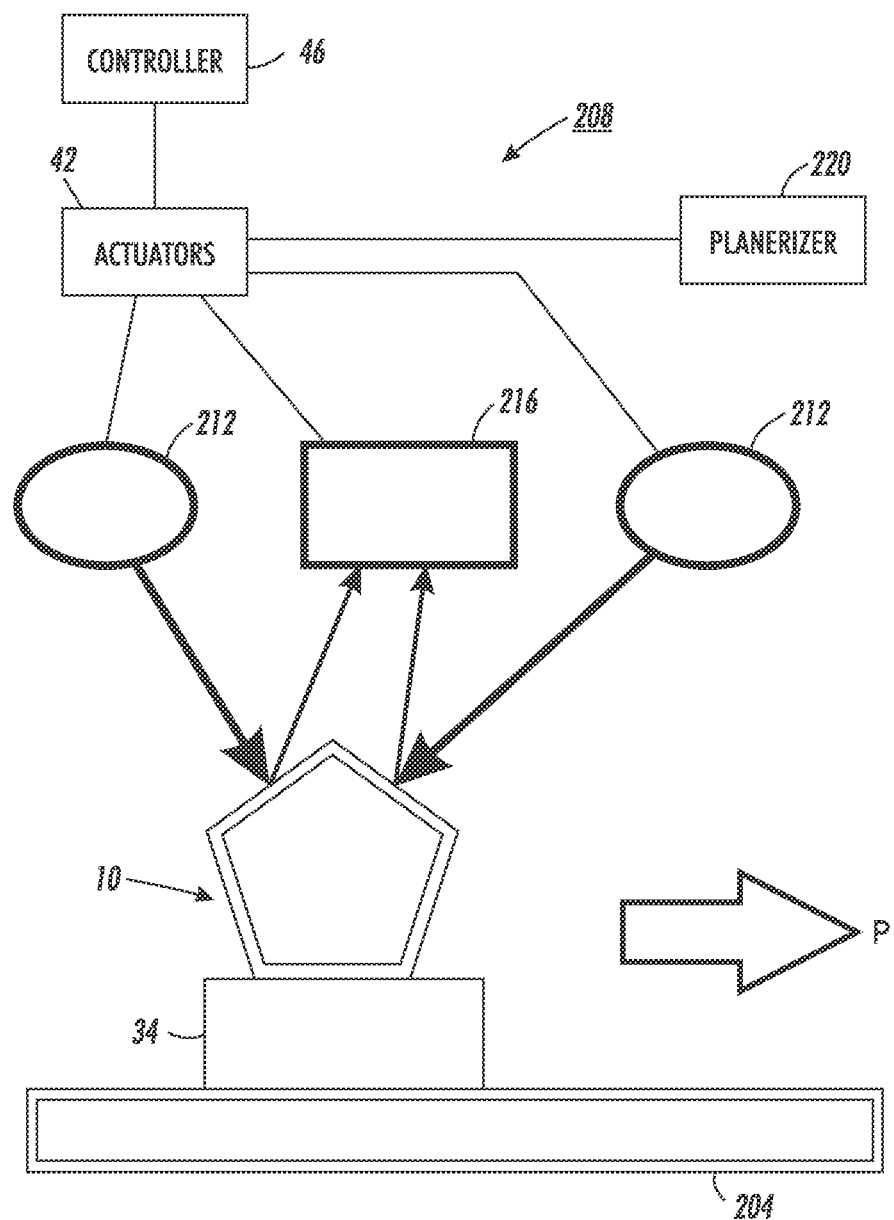
FIG. 2 is a side view of a monitoring station where measurements of the object are obtained.

After a layer of the object 10 has been formed with drops of material from the ejectors 22, 26, a transport 204 can move the substrate 34 in a process direction P to a monitoring station 208 as shown in the side view of the monitoring station presented in FIG. 2. The monitoring station 208 includes a plurality of light sources 212, which direct light onto surfaces of object 10. The specular and diffuse reflections of the light by the surfaces of the object 10 are received by an optical sensor array 216, which includes a plurality of photo detectors arranged in a linear array. In one embodiment, the light sources 212 are white light sources. The optical light sources 212 and the sensor array 216 are operatively connected to the actuators 42 to enable the controller 46 to move the light sources and the sensor array bi-directionally vertically, bi-directionally in the cross-process direction, and bi-directionally in the process direction. The ability to move the light sources and the sensor array in this manner enables the optical sensor arrays to generate image data corresponding to the surfaces of the object 10 that reflect the light. These image data are processed to identify measurements of the object and the features of the object and these measurements are compared to image data used to operate the ejectors to form the object. For identified measurements that are outside of a predetermined range about expected values for the features, the controller operates the actuators 42 to return the object to a position opposite the ejectors 22, 26 so material can be added to the object 10, if material is missing from a layer or feature. The controller 46 can also move the object 10 to a position opposite a planerizer 220 to remove material to correct the object during its manufacture, if the measurements indicate a layer or feature has too much material.

In the process described below, the sensor array 216 passes over the surface of the object 10. As the sensor array passes over the surface, the light sources 212 direct light onto the surface of the object. The surface reflects or scatters the light depending upon the relative flatness of the surface that the light hits. One of the photo detectors in the sensor array receives the reflected light and generates an electrical signal that is proportional to the amplitude of the light received by the photo detector. A/D circuits convert the electrical signals received from the photo detectors of the sensor array 216 into digital values and these digital values are delivered to the controller 46. The controller 46 stores these digital values in a memory operatively connected to the controller.

In more detail, the linear array of photo detectors in an optical sensor array 216 is fabricated as a semiconductor circuit. In one embodiment of the optical sensor array 216 shown in FIG. 5, three linear arrays of photo detectors 404 having a resolution of approximately 400 spi are positioned parallel to one another. Each array of photo detectors in this embodiment are filtered to one of the colors red, green, and blue (RGB). This configuration enables the optical sensor array 216 to provide full-color image data of the object. In embodiments that produce only monochromatic data, the green-filtered array is the only array used. Thus, monochromatic optical sensor arrays can be implemented with a full-color optical sensor array and the other two color-filtered arrays ignored, or the monochromatic sensor array can be implemented with a single, green light filtered linear array of photodetectors.

Figure 3:
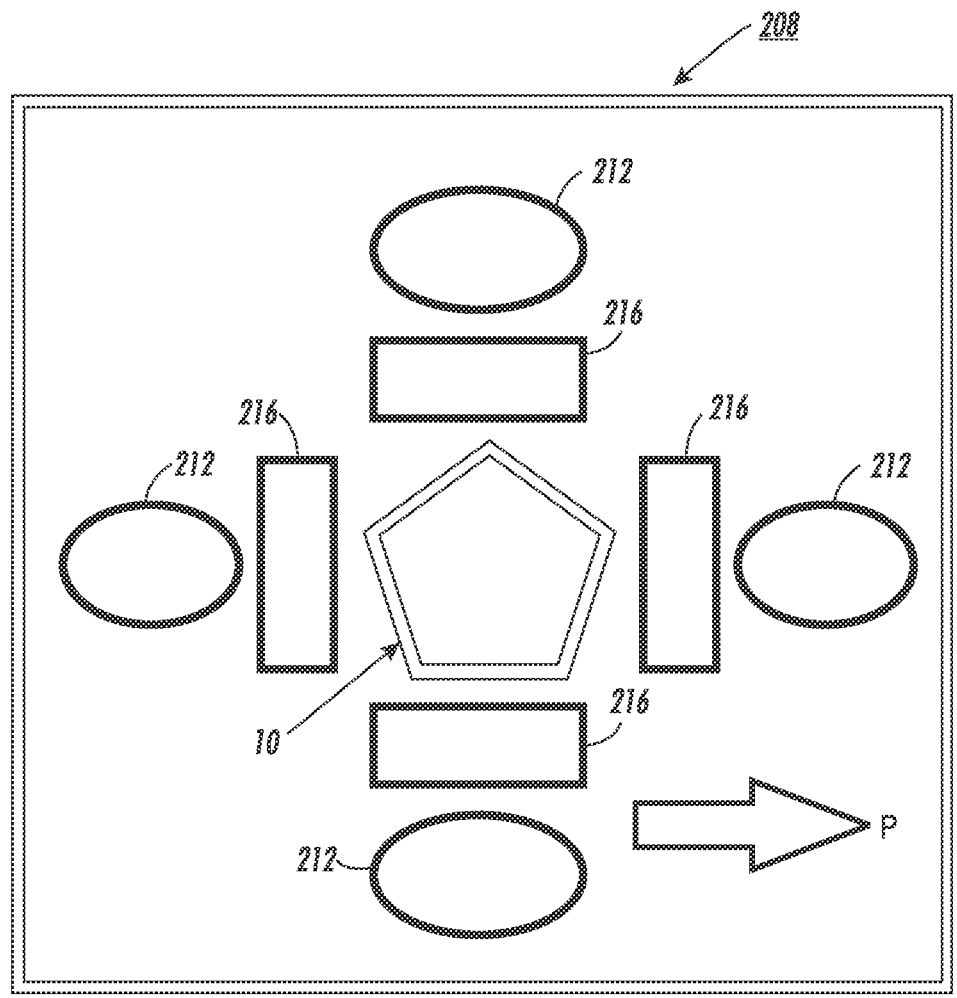
FIG. 3 is a top view of the station shown in FIG. 2.

A top view of the monitoring station 208 is shown in FIG. 3. In this view, four light sources 212 and four sensor arrays 216 are depicted. The multiple light sources 212 and sensor arrays 216 were not shown in FIG. 2 to simplify the discussion of the station. Multiple light sources and sensor arrays are provided to enable all of the side surfaces and the top surface of the object 10 to be illuminated and imaged. As noted above in the discussion of FIG. 2, these light sources and sensor arrays are operatively connected to the actuators 42 so the controller 46 can operate the actuators and move the light sources and sensor arrays bi-directionally vertical as well as in the process and cross-process directions. The controller 46 stores the digital values corresponding to the signals generated by the sensor arrays 216 as measurements for the features of each surface of the object 10.

A method 500 of operating a printer that produces three-dimensional objects is shown in FIG. 4. In the description of this method, statements that a process is performing some task or function refers to a controller or general purpose processor executing programmed instructions stored in a memory operatively connected to the controller or processor to manipulate data or to operate one or more components in the printer to perform the task or function. The controller 46 noted above can be such a controller or processor. Alternatively, the controller 46 can be implemented with more than one processor and associated circuitry and components, each of which is configured to form one or more tasks or functions described herein.

At predetermined times in the printing operation, the controller 46 (FIG. 1) operates the transport 204 to move the substrate 34 away from the ejectors 22, 26 to the monitoring station 208 (block 504). The controller then operates the actuators 42 to position the light sources 212 and the optical sensor arrays 216 opposite different sides of the object (block 508). The light sources direct light onto the surfaces of the object and the photo detectors of the sensor arrays generate image data of a portion of the object. Once the data collection is completed (block 512), the controller stores the generated data (block 516). Using the stored data, the controller identifies measurements for the object and features of the object (block 520) and compares these measurements to expected measurements that correspond to the data used to operate the ejectors and form the object (block 524). Any differences outside of a predetermined range are used to operate the transport to move the object opposite the planerizer 220 (FIG. 2) or to a position opposite the ejectors 22, 26 to enable the addition of material to the object to compensate for the discrepancy (block 528). Then, the controller 46 operates the object to be opposite the ejectors 22, 26, if it is already not at that position, so the ejectors can be operated to further manufacture the object (block 532). The process of FIG. 2 is performed from time to time (block 536) during the manufacture of the object until the manufacture of the object is completed.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed is:

1. A three-dimensional object printer comprising:
    a substrate on which an object is formed by the three-dimensional object printer;
    a plurality of light sources configured to direct light onto surfaces of the object on the substrate;
    a plurality of optical sensor arrays having a plurality of photo detectors, the optical sensor arrays being configured to generate image data of the surfaces of the object from which the photo detectors receive light;
    at least one actuator operatively connected to the plurality of light sources and the plurality of optical sensor arrays to move the light sources and the optical sensor arrays with reference to the object; and
    a controller operatively connected to the at least one actuator, the plurality of light sources, and the plurality of optical sensor arrays, the controller being configured to operate the at least one actuator to move the object on the substrate to a position opposite the plurality of light sources and the plurality of optical sensor arrays, and to identify measurements of the object on the substrate and features of the object with reference to the data received from the plurality of optical sensor arrays.

2. The printer of claim 1, the controller being further configured to operate the at least one actuator to move each optical sensor array in the plurality of optical sensor arrays bi-directionally vertically.

3. The printer of claim 2, the controller being further configured to operate the at least one actuator to move each light source in the plurality of light sources bi-directionally vertically.

4. The printer of claim 1 further comprising:
    a transport configured to move the substrate from an area where the object is made on the substrate to the position opposite the plurality of light sources and the plurality of optical sensor arrays.

5. The printer of claim 1, each light source further comprising:
    a source of white light oriented to illuminate a field of view of the photo detectors of each optical sensor array in the plurality of optical sensor arrays.

6. The printer of claim 1, at least one optical sensor array further comprising:
    at least two linear arrays of photo detectors positioned parallel to one another.

7. The printer of claim 6, the optical sensor array further comprising:
    three linear arrays of photo detectors positioned parallel to one another.

8. The printer of claim 7, the three linear arrays further comprising:
    a filter for filtering green light for one of the three linear arrays;
    a filter for filtering red light for another one of the three linear arrays that is different than the one having the filter for filtering green light; and
    a filter for filtering blue light for one of the three linear arrays that different than the linear array having the filter for filtering green light and the linear array having the filter for filtering red light.

9. The printer of claim 1, the optical sensor being further configured to be one of a chromatic optical sensor and a monochromatic optical sensor.

10. The printer of claim 1, the optical sensor being further comprising:
    a single linear array of photo detectors having a filter for filtering green light.

* * * * *